(12) United States Patent
Bai et al.

(10) Patent No.: US 11,150,704 B2
(45) Date of Patent: Oct. 19, 2021

(54) DISPLAY PANEL AND ELECTRONIC APPARATUS

(71) Applicant: Wuhan China Star Optoelectronics Semiconductor Display Technology Co., Ltd., Hubei (CN)

(72) Inventors: Siqin Bai, Hubei (CN); Yong Zhao, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 265 days.

(21) Appl. No.: 16/326,697

(22) PCT Filed: Nov. 28, 2018

(86) PCT No.: PCT/CN2018/117911
§ 371 (c)(1),
(2) Date: Feb. 19, 2019

(87) PCT Pub. No.: WO2020/077748
PCT Pub. Date: Apr. 23, 2020

(65) Prior Publication Data
US 2021/0004061 A1    Jan. 7, 2021

(30) Foreign Application Priority Data
Oct. 18, 2018   (CN) .......................... 201811213870.1

(51) Int. Cl.
*G06F 1/16*   (2006.01)
*H05K 5/00*   (2006.01)
*H05K 7/00*   (2006.01)
*G06F 1/18*   (2006.01)

(52) U.S. Cl.
CPC ............ *G06F 1/181* (2013.01); *G06F 1/1609* (2013.01); *G06F 1/1626* (2013.01)

(58) Field of Classification Search
CPC ....... G06F 1/181; G06F 1/1609; G06F 1/1626
See application file for complete search history.

(56) References Cited

U.S. PATENT DOCUMENTS

| | | | |
|---|---|---|---|
| 9,697,764 B2 * | 7/2017 | Kim | H01L 51/5237 |
| 2013/0076649 A1 * | 3/2013 | Myers | G06F 3/0485 |
| | | | 345/173 |
| 2015/0043142 A1 * | 2/2015 | Jang | G06F 1/1601 |
| | | | 361/679.26 |

(Continued)

FOREIGN PATENT DOCUMENTS

| | | |
|---|---|---|
| CN | 202166800 U | 3/2012 |
| CN | 102621732 A | 8/2012 |

(Continued)

*Primary Examiner* — Anthony M Haughton
(74) *Attorney, Agent, or Firm* — Hamre, Schumann, Mueller & Larson, P.C.

(57) ABSTRACT

The display panel and the electronic apparatus include: a substrate, wherein the substrate includes a first portion and a bent portion connected to the first portion; wherein the bent portion includes at least a first sub-bent portion and a second sub-bent portion connected to each other, and the first sub-bent portion extends from the first portion, and a bent angle of the first sub-bent portion is less than 180 degrees.

6 Claims, 3 Drawing Sheets

(56) References Cited

U.S. PATENT DOCUMENTS

| | | | |
|---|---|---|---|
| 2016/0091932 A1* | 3/2016 | Dighde | B29C 65/02 |
| | | | 361/679.26 |
| 2016/0139438 A1 | 5/2016 | Jing et al. | |
| 2017/0047351 A1* | 2/2017 | Kwon | G09G 5/00 |
| 2017/0098794 A1* | 4/2017 | Cho | H01L 51/0097 |
| 2017/0293194 A1* | 10/2017 | Hou | G02F 1/13306 |
| 2018/0143669 A1* | 5/2018 | Bok | G06F 1/1626 |
| 2018/0366685 A1* | 12/2018 | Park | H01L 51/524 |

FOREIGN PATENT DOCUMENTS

| | | |
|---|---|---|
| CN | 104360507 A | 2/2015 |
| CN | 106654065 A | 5/2017 |
| CN | 208737127 U | 4/2019 |

\* cited by examiner

DISPLAY PANEL AND ELECTRONIC APPARATUS

FIELD OF THE INVENTION

The present application relates to a display field, and more particularly to a display panel and an electronic apparatus.

BACKGROUND OF THE INVENTION

Electronic apparatus, such as smart phones, may include a display panel. As the requirements of users for the appearance of the electronic apparatus are getting higher and higher, the frame effect of the electronic apparatus is getting more and more attention, and the frame effect becomes an important factor affecting the visual effect. The frame of the existing smart phone is too wide, which affects the visual perception of the consumer to view the display panel and reduces the user experience.

SUMMARY OF THE INVENTION

An objective of the embodiment of the present application is to provide a display panel and an electronic apparatus, which can solve the problem that the frame of the existing electronic apparatus is too wide.

The embodiment of the present application provides a display panel, including: a substrate, wherein the substrate includes a first portion and a bent portion connected to the first portion; wherein the bent portion includes at least a first sub-bent portion and a second sub-bent portion connected to each other, and the first sub-bent portion extends from the first portion, and a bent angle of the first sub-bent portion is less than 180 degrees;

the bent portion further includes a third sub-bent portion, and the third sub-bent portion is connected to the second sub-bent portion; the bent portion is provided with a first corner point and a second corner point, and the first sub-bent portion extends from the first portion to the first corner point; the second sub-bent portion extends from the first corner point to the second corner point; the third sub-bent portion extends from the second corner point; and a protective film is disposed on the substrate, and the protective film is bent along with the bent portion.

In the display panel of the present application, a sum of the bent angle of the first sub-bent portion and a bent angle of the third sub-bent portion is equal to 180 degrees, and a bent angle of the second sub-bent portion is 180 degrees.

In the display panel of the present application, the display panel further includes a first support plate, wherein the first support plate includes a first surface and a second surface, which are opposite to each other, and the first portion is disposed on the first surface, and the support plate is configured to support the first portion;

the bent portion is bent by a plurality of times along an end portion of the first support plate to be bent to one side of the second surface.

the bent portion is bent by a plurality of times along an end portion of the first support plate to be bent to one side of the second surface.

In the display panel of the present application, the first sub-bent portion includes: a first curved segment and a first straight segment connected to each other, and a gap is between the first curved segment and the filler piece, and the first straight segment is attached on the filler piece;

the third sub-bent portion includes: a second curved segment and a second straight segment connected to each other, and a gap is between the second curved segment and the filler piece, and the second straight segment is attached on the filler piece.

In the display panel of the present application, the display panel further includes a second support plate, wherein the second straight segment is disposed on a surface of the second support plate.

The embodiment of the present application further provides a display panel, including: a substrate, wherein the substrate includes a first portion and a bent portion connected to the first portion; wherein the bent portion includes at least a first sub-bent portion and a second sub-bent portion connected to each other, and the first sub-bent portion extends from the first portion, and a bent angle of the first sub-bent portion is less than 180 degrees.

In the display panel of the present application, the bent portion further includes a third sub-bent portion, and the third sub-bent portion is connected to the second sub-bent portion;

wherein the bent portion is provided with a first corner point and a second corner point, and the first sub-bent portion extends from the first portion to the first corner point; the second sub-bent portion extends from the first corner point to the second corner point; the third sub-bent portion extends from the second corner point.

In the display panel of the present application, a sum of the bent angle of the first sub-bent portion and a bent angle of the third sub-bent portion is equal to 180 degrees, and a bent angle of the second sub-bent portion is 180 degrees.

In the display panel of the present application, the display panel further includes a first support plate, wherein the first support plate includes a first surface and a second surface, which are opposite to each other, and the first portion is disposed on the first surface, and the support plate is configured to support the first portion;

the bent portion is bent by a plurality of times along an end portion of the first support plate to be bent to one side of the second surface.

In the display panel of the present application, a filler piece is disposed between the bent portion and the first support plate, and the filler piece is located at the one side of the second surface, and the filler piece is configured to fix the bent portion.

In the display panel of the present application, the second sub-bent portion is attached on the filler piece, and both the first sub-bent portion and the third sub-bent portion are partially attached on the filler piece.

In the display panel of the present application, the first sub-bent portion includes: a first curved segment and a first straight segment connected to each other, and a gap is between the first curved segment and the filler piece, and the first straight segment is attached on the filler piece;

the third sub-bent portion includes: a second curved segment and a second straight segment connected to each other, and a gap is between the second curved segment and the filler piece, and the second straight segment is attached on the filler piece.

In the display panel of the present application, the display panel further includes a second support plate, wherein the second straight segment is disposed on a surface of the second support plate.

In the display panel of the present application, a protective film is disposed on the substrate, and the protective film is bent along with the bent portion.

The embodiment of the present application further provides an electronic apparatus, including a display panel, wherein the display panel includes: a substrate, wherein the substrate includes a first portion and a bent portion connected to the first portion; wherein the bent portion includes at least a first sub-bent portion and a second sub-bent portion connected to each other, and the first sub-bent portion extends from the first portion, and a bent angle of the first sub-bent portion is less than 180 degrees.

In the electronic apparatus of the present application, the bent portion further includes a third sub-bent portion, and the third sub-bent portion is connected to the second sub-bent portion;

wherein the bent portion is provided with a first corner point and a second corner point, and the first sub-bent portion extends from the first portion to the first corner point; the second sub-bent portion extends from the first corner point to the second corner point; the third sub-bent portion extends from the second corner point.

In the electronic apparatus of the present application, a sum of the bent angle of the first sub-bent portion and a bent angle of the third sub-bent portion is equal to 180 degrees, and a bent angle of the second sub-bent portion is 180 degrees.

In the electronic apparatus of the present application, the display panel further includes a first support plate, wherein the first support plate includes a first surface and a second surface, which are opposite to each other, and the first portion is disposed on the first surface, and the support plate is configured to support the first portion;

the bent portion is bent by a plurality of times along an end portion of the first support plate to be bent to one side of the second surface.

The display panel and the electronic apparatus of the embodiment of the present invention include: a substrate, wherein the substrate includes a first portion and a bent portion connected to the first portion; wherein the bent portion includes at least a first sub-bent portion and a second sub-bent portion connected to each other, and the first sub-bent portion extends from the first portion, and a bent angle of the first sub-bent portion is less than 180 degrees. The display panel and the electronic apparatus of the embodiment of the present invention are bent by a multiple bending manner, so that a traditional direct bending is decomposed into multiple bendings. While ensuring the narrow frame of the display panel, the stress of the display panel is effectively reduced, thereby improving the service life of the display panel.

BRIEF DESCRIPTION OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

DETAILED DESCRIPTION OF PREFERRED EMBODIMENTS

Figure 1:
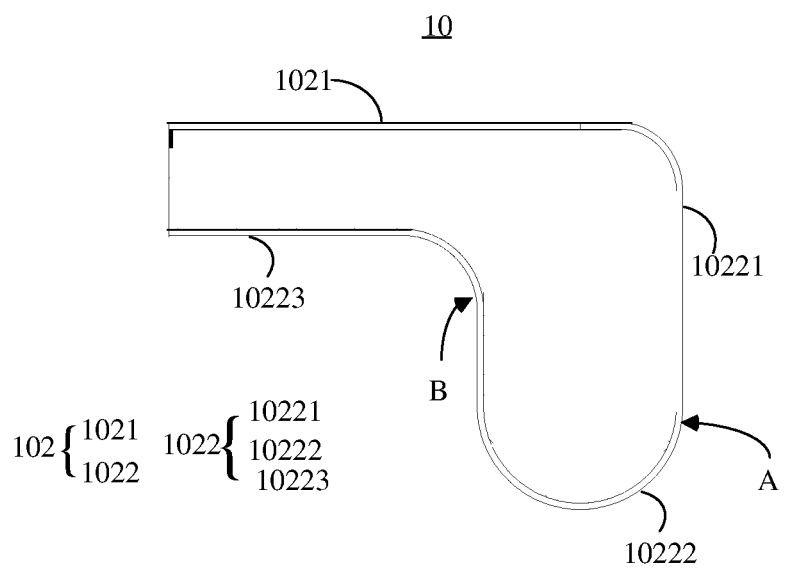
FIG. 1 is a structural diagram of a display panel according to an embodiment of the present application.

The embodiments of the present application are described in detail below, and the examples of the embodiments are illustrated in the drawings, wherein the same or similar reference numerals are used to refer to the same or similar elements or elements having the same or similar functions. The embodiments described below with reference to the drawings are intended to be illustrative for the present application and are not to be construed as limitation.

In the description of the present application, it is to be understood that the terms "center", "longitudinal", "transverse", "length", "width", "thickness", "upper", "lower", "front", "Orientation of "post", "left", "right", "vertical", "horizontal", "top", "bottom", "inside", "outside", "clockwise", "counterclockwise", etc. are positional relationships based on the orientations or positional relationships shown in the drawings, and are merely for the convenience of the description of the present application and the simplified description, and do not indicate or imply that the device or component referred to have specific orientations, and are constructed and operated in specific orientations. Therefore, these should not be construed as limiting the present application. Moreover, the terms "first" and "second" are used for descriptive purposes only and are not to be construed as indicating or implying a relative importance or implicitly indicating the number of indicated technical features. Thus, features defining "first" and "second" may include one or more of the features with either explicitly or implicitly. In the description of the present application, "plurality" means two or more unless with being specifically indicated otherwise.

In the description of the present application, which needs explanation is that the term "installation", "connected", "connection" should be broadly understood unless those are clearly defined and limited, otherwise, For example, those can be a fixed connection, a detachable connection, or an integral connection; those can be a mechanical connection, an electrical connection or a mutual communication; those can be a direct connection, or an indirect connection with an intermediary, which may be an internal communication of two elements or an interaction of two elements. To those of ordinary skill in the art, the specific meaning of the above terminology in the present application can be understood according to the specific circumstances.

In the present application, the first feature "on" or "under" the second feature may include direct contact of the first and second features, and may also include that the first and second features are not in direct contact but are contacted by additional features between them. Moreover, the first feature "above", "above" and "on" the second feature includes that the first feature is directly above and obliquely above the second feature, or merely indicates that a level of the first feature is higher than that of the second feature. The first feature "below", "under" and "beneath" the second feature includes that the first feature is directly below and obliquely below the second feature, or merely indicates that a level of the first feature is lower than that of the second feature.

The following disclosure provides many different embodiments or illustrations for implementing different structures of the present application. In order to simplify the disclosure of the present application, the components and arrangements of the specific illustrations are described below. Certainly, they are merely illustrations and are not intended to limit the present application. In addition, the present application may be repeated with reference to the numerals and/or reference numerals in the various embodiments, which are for the purpose of simplicity and clarity, and do not indicate the relationship between the various embodiments and/or arrangements discussed. Moreover, the present application provides illustrations of various specific processes and materials, but one of ordinary skill in the art will recognize the use of other processes and/or the use of other materials.

Please refer to FIG. 1. FIG. 1 is a structural diagram of a display panel according to an embodiment of the present application. As shown in FIG. 1, the display panel 10 of the embodiment of the present application includes: a substrate 102, wherein the substrate 102 includes a first portion 1021 and a bent portion 1022 connected to the first portion 1021. The bent portion 1022 includes at least a first sub-bent portion 10221 and a second sub-bent portion 10222 connected to each other, and the first sub-bent portion 10221 extends from the first portion 1021, and a bent angle of the first sub-bent portion 10221 is less than 180 degrees.

The display panel of the embodiment of the present invention is bent by a multiple bending manner, so that a traditional direct bending is decomposed into multiple bendings. While ensuring the narrow frame of the display panel 10, the stress of the display panel 10 is effectively reduced, thereby improving the service life of the display panel 10.

Figure 2:
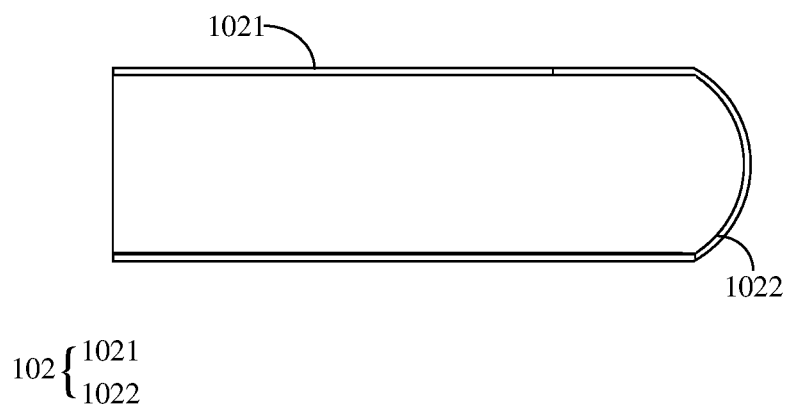
FIG. 2 is a structural diagram of a display panel according to the prior art.

For instance, please refer to FIG. 2. FIG. 2 is a structural diagram of a display panel according to the prior art. The difference between the display panel 20 shown in FIG. 2 and the display panel 10 shown in FIG. 1 is that: in the display panel 20 shown in FIG. 2, the bent portion 1022 is bent by one bending, and in the display panel 10 shown in FIG. 1, the bent portion 1022 is bent by bending multiple times.

As shown in FIG. 2, the display panel 20 includes a substrate 102. The substrate 102 includes a first portion 1021 and a bent portion 1022 connected to the first portion 1021. A bent angle of the bent portion 1022 is 180 degrees. Namely, the bent portion 1022 of the display panel 20 is bent by one time. In order to ensure that the stress on the bent portion 1022 is moderate, the bent radius is large, and it is difficult to achieve a narrow frame effect.

Still referring to FIG. 1, the bent portion 1022 of the display panel 10 includes at least a first sub-bent portion 10221 and a second sub-bent portion 10222 connected to each other. A bent angle of the first sub-bent portion is less than 180 degrees. The stress received by the bent portion 1022 is much smaller than the stress received by the bent portion 1022 when the bent angle is 180 degrees. Therefore, the bent radius can be made smaller, thus achieving a narrower frame effect.

In some embodiments, the bent portion 1022 further includes a third sub-bent portion 10223, and the third sub-bent portion 10223 is connected to the second sub-bent portion 10222. The bent portion 1022 is provided with a first corner point A and a second corner point B, and the first sub-bent portion 10221 extends from the first portion 1021 to the first corner point A; the second sub-bent portion 10222 extends from the first corner point A to the second corner point B; the third sub-bent portion 10223 extends from the second corner point B.

Besides, a sum of the bent angle of the first sub-bent portion 10221 and a bent angle of the third sub-bent portion 10223 of the display panel 10 according to the embodiment of the present invention is equal to 180 degrees, and a bent angle of the second sub-bent portion 10222 is 180 degrees.

Namely, the display panel of the embodiment of the present invention is bent by a multiple bending manner, and the bent angle of the first sub-bent portion 10221, the bent angle of the second sub-bent portion 10222, and the bent angle of the third sub-bent portion 10223 are controlled, so that a traditional direct bending is decomposed into multiple bendings. While ensuring the narrow frame of the display panel 10, the stress of the display panel 10 is effectively reduced, thereby improving the service life of the display panel 10.

Figure 3:
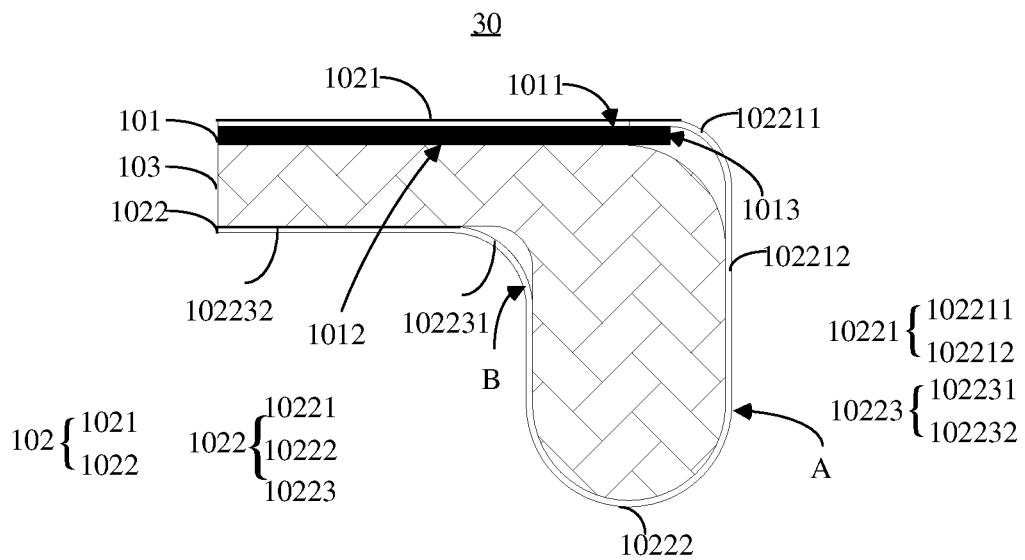
FIG. 3 is another structural diagram of a display panel according to an embodiment of the present application.

Please refer to FIG. 3. FIG. 3 is another structural diagram of a display panel according to an embodiment of the present application. As shown in FIG. 3, the display panel 30 of the embodiment of the present application includes: a first support plate 101, a filler piece 103 and a substrate 102. The first support plate 101 includes a first surface 1011 and a second surface 1012, which are opposite to each other, and the support plate 101 is configured to support the substrate 102. The substrate 102 includes a first portion 1021 and a bent portion 1022 connected to the first portion 1021. The first portion 1021 is disposed on the first surface 1011 of the first support plate 101, and the bent portion 1022 is bent by a multiple bending manner. The filler piece 103 of the display panel 30 is disposed between the bent portion 1022 and the first support plate 101. The filler piece 103 is configured to fix the bent portion 102.

It can be understood that the first portion 1021 of the display panel 30 of the embodiment of the present application is used for displaying a picture and is supported by the first support plate 101. In addition, the bent portion 1022 can be bent to the second surface 1012 of the first support plate 101, thereby narrowing the frame of the display panel 30.

In some embodiments, please continue to refer to FIG. 3, the bent portion 1022 is bent by multiple times along the first support plate 101. Namely, the bent portion 1022 is bent to the second surface 1012 of the first support plate 101 by a multiple bending manner. The bent portion 1022 is first bent along the end portion 1013 of the first support plate 101, and then a second bending is made at the first corner point A, and finally, the third bending is made at the second corner point B to bend the bent portion 102 to the second surface of the support plate.

As performing the first bending, the bent portion 1022 is bent at the first bent angle along the end portion 1013 of the first support plate 101. The first bent angle can be specifically set according to actual needs, and those skilled in the art can comprehensively consider the stress magnitude and the bent radius.

As performing the second bending, it is bent at the first corner point A at a second bent angle. In the display panel of the embodiment of the present application, the bent portion 1022 is bent to the second surface 1012 of the first support plate 101. Therefore, in the embodiment of the present application, the third bent angle is set to be 180 degrees. Since the bent portion 1022 has been bent below the display panel 10 as performing the second bending, the second bending does not affect the frame of the display panel 10. In addition, the bent radius of the second bending can be adaptively adjusted according to the process.

As performing the third bending, it is bent at the second corner point B at a third bent angle. A sum of the third bent angle and the first bent angle is equal to 180 degrees. Ultimately, the bent portion 102 can be bent to the second surface 1012 of the first support plate 101.

The bent portion 1022 includes: a first sub-bent portion 10221, a second sub-bent portion 10222 and a third sub-bent portion 10223. The first sub-bent portion 10221 is connected to the first portion 1021. The second sub-bent portion 10222 is disposed between the first corner point A and the second corner point B. The third sub-bent portion 10223 is connected to the second sub-bent portion 10222. One end of the second sub-bent portion 10222 is connected to the first sub-bent portion 10221. The other end of the second sub-bent portion 10222 is connected to the third sub-bent portion 10223.

In addition, the second sub-bent portion 10222 is attached on the filler piece 103, and both the first sub-bent portion 10221 and the third sub-bent portion 10223 are partially attached on the filler piece 103. Namely, In some embodiments, the first sub-bent portion 10221 includes: a first curved segment 102211 and a first straight segment 102212 connected to each other, and a gap is between the first curved segment 102211 and the filler piece 103, and the first straight segment 102212 is attached on the filler piece 103. The third sub-bent portion 10223 includes: a second curved segment 102231 and a second straight segment 102232 connected to each other, and a gap is between the second curved segment 102231 and the filler piece 103, and the second straight segment 102232 is attached on the filler piece 103.

Figure 4:
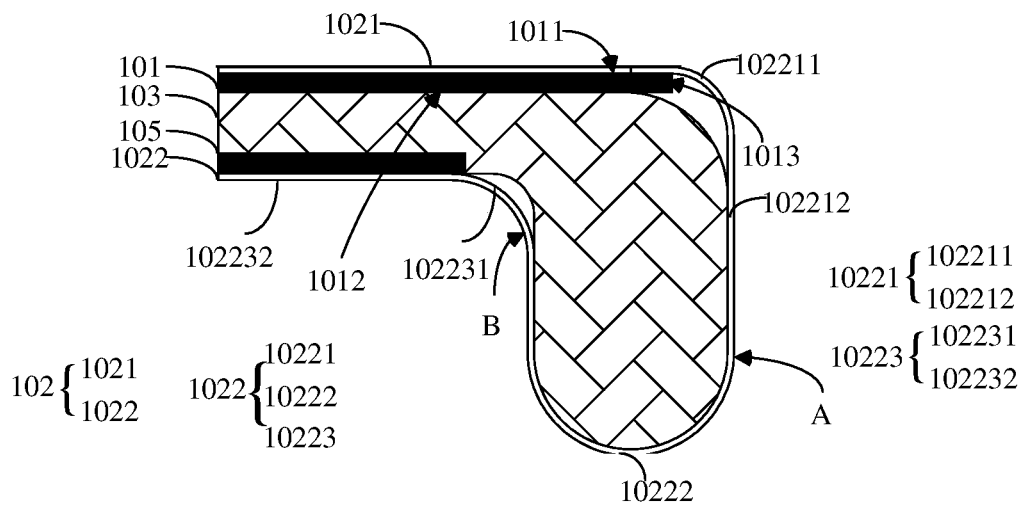
FIG. 4 is one another structural diagram of a display panel according to an embodiment of the present application.

Please refer to FIG. 4. FIG. 4 is one another structural diagram of a display panel according to an embodiment of the present application. As shown in FIG. 4, the difference between the display panel 40 shown in FIG. 4 and the display panel 30 shown in FIG. 3 is that the display panel 40 shown in FIG. 4 further includes a second support plate 105, and the second straight segment 102232 is disposed on the surface of the second support plate 105. The second support plate 105 is configured to support the substrate 102.

Figure 5:
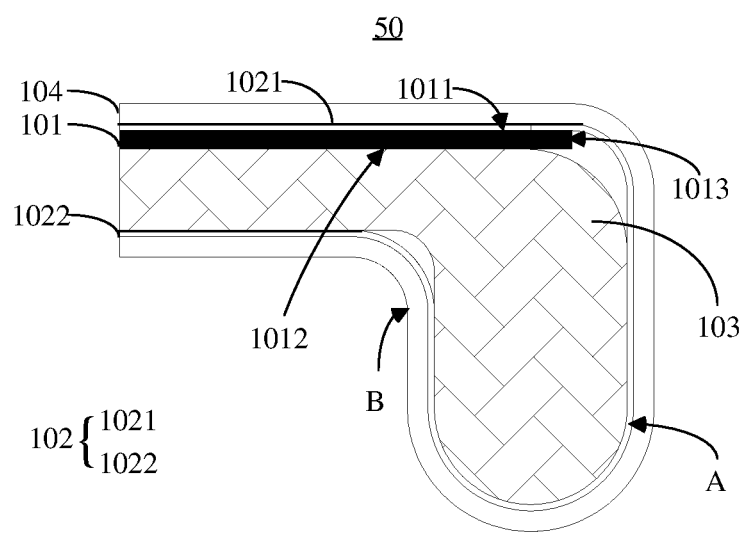
FIG. 5 is one another structural diagram of a display panel according to an embodiment of the present application.

Please refer to FIG. 5. FIG. 5 is one another structural diagram of a display panel according to an embodiment of the present application. As shown in FIG. 5, the display panel 50 shown in FIG. 5 differs from the display panel 30 shown in FIG. 3 in that the display panel 50 shown in FIG. 5 is provided with a protective film 104 on the substrate 102. The protective film 104 can function to protect the wirings in the bent portion and to fix display panel. The protective film is bent along with the bent portion 1022.

The display panel of the embodiment of the present invention include: a substrate, wherein the substrate includes a first portion and a bent portion connected to the first portion; wherein the bent portion includes at least a first sub-bent portion and a second sub-bent portion connected to each other, and the first sub-bent portion extends from the first portion, and a bent angle of the first sub-bent portion is less than 180 degrees. The display panel and the electronic apparatus of the embodiment of the present invention are bent by a multiple bending manner, so that a traditional direct bending is decomposed into multiple bendings. While ensuring the narrow frame of the display panel, the stress of the display panel is effectively reduced, thereby improving the service life of the display panel.

The embodiment of the present application further provides an electronic apparatus, which includes the display panel described in the above embodiments. For details, refer to the above description, and no further details are provided herein.

The display panel and the electronic apparatus provided by the embodiments of the present application are described in detail. The principles and implementations of the present application are described in the specific examples. The description of the above embodiments is only for helping to understand the present application. Meanwhile, those skilled in the art will be able to change the specific embodiments and the scope of the application according to the idea of the present application. In conclusion, the content of the specification should not be construed as limiting the present application.

What is claimed is:

1. A display panel, including:
a substrate, wherein the substrate includes a first portion and a bent portion connected to the first portion;
a first support plate including a first surface and a second surface opposite to the first surface, wherein the first portion is disposed on the first surface, the first support plate is configured to support the first portion, and the bent portion is bent by a plurality of times along an end portion of the first support plate to be bent to one side of the second surface; and
a filler piece disposed between the bent portion and the first support plate and located at the one side of the second surface, wherein the filler piece is configured to fix the bent portion;
wherein the bent portion includes at least a first sub-bent portion and a second sub-bent portion connected to each other, a third sub-bent portion connected to the second sub-bent portion, and the first sub-bent portion extends from the first portion, and a bent angle of the first sub-bent portion is less than 180 degrees, wherein the bent portion is provided with a first corner point and a second corner point, the first sub-bent portion extends from the first portion to the first corner point, the second sub-bent portion extends from the first corner point to the second corner point, and the third sub-bent portion extends from the second corner point.

2. The display panel according to claim 1, wherein a sum of the bent angle of the first sub-bent portion and a bent angle of the third sub-bent portion is equal to 180 degrees, and a bent angle of the second sub-bent portion is 180 degrees.

3. The display panel according to claim 1, wherein the second sub-bent portion is attached on the filler piece, and both the first sub-bent portion and the third sub-bent portion are partially attached on the filler piece.

4. The display panel according to claim 3, wherein the first sub-bent portion includes: a first curved segment and a first straight segment connected to each other, and a gap is between the first curved segment and the filler piece, and the first straight segment is attached on the filler piece;
the third sub-bent portion includes: a second curved segment and a second straight segment connected to each other, and a gap is between the second curved segment and the filler piece, and the second straight segment is attached on the filler piece.

5. The display panel according to claim 4, further including a second support plate, wherein the second straight segment is disposed on a surface of the second support plate.

6. The display panel according to claim 1, wherein a protective film is disposed on the substrate, and the protective film is bent along with the bent portion.

* * * * *